(12) United States Patent
DiTullio et al.

(10) Patent No.: US 10,540,168 B2
(45) Date of Patent: Jan. 21, 2020

(54) MOBILE APPLICATION WEBVIEW MODIFICATION

(71) Applicant: Apptimize LLC, San Francisco, CA (US)

(72) Inventors: Jeff DiTullio, Menlo Park, CA (US); Devon Richards, Richardson, TX (US); Steven Cole Flournoy, San Francisco, CA (US)

(73) Assignee: Apptimize LLC, San Francisco, CA (US)

( * ) Notice: Subject to any disclaimer, the term of this patent is extended or adjusted under 35 U.S.C. 154(b) by 0 days.

(21) Appl. No.: 15/968,042

(22) Filed: May 1, 2018

(65) Prior Publication Data
US 2018/0314513 A1   Nov. 1, 2018

Related U.S. Application Data

(60) Provisional application No. 62/492,410, filed on May 1, 2017.

(51) Int. Cl.
*H04L 29/08* (2006.01)
*G06F 16/955* (2019.01)
*G06F 8/65* (2018.01)

(52) U.S. Cl.
CPC ............ *G06F 8/65* (2013.01); *G06F 16/9566* (2019.01); *H04L 67/34* (2013.01)

(58) Field of Classification Search
None
See application file for complete search history.

(56) References Cited

U.S. PATENT DOCUMENTS

| | | | |
|---|---|---|---|
| 8,826,145 B1* | 9/2014 | Kirkpatrick | G06F 5/00 715/746 |
| 9,178,934 B1* | 11/2015 | Kolam | H04L 67/2823 |
| 10,140,125 B1* | 11/2018 | Bhasin | G06F 9/48 |
| 10,210,263 B1* | 2/2019 | Yeom | G06F 16/9535 |
| 2008/0294750 A1* | 11/2008 | Kosonen | H04L 67/306 709/219 |
| 2011/0113353 A1* | 5/2011 | Koh | G06F 3/0488 715/760 |
| 2011/0161440 A1* | 6/2011 | Juvet | G06Q 10/107 709/206 |
| 2012/0036226 A1* | 2/2012 | Chor | H04L 67/02 709/219 |
| 2012/0180073 A1* | 7/2012 | Hung | G06F 16/9566 719/313 |

(Continued)

*Primary Examiner* — Isaac T Tecklu
(74) *Attorney, Agent, or Firm* — Fenwick & West LLP (57) ABSTRACT

Techniques to facilitate modification of content displayed in a webview embedded into a mobile application are disclosed herein. In at least one implementation, webview modification instructions provided by an application development and optimization platform are received that indicate modified webview content associated with a uniform resource identifier (URI) accessed by the mobile application in the webview. Execution of the mobile application is monitored for an occurrence of an event that triggers loading of the URI in the webview of the mobile application. Responsive to the event, the webview modification instructions are executed to present the modified webview content in the webview of the mobile application.

20 Claims, 9 Drawing Sheets

(56) References Cited

U.S. PATENT DOCUMENTS

| | | | |
|---|---|---|---|
| 2013/0144836 A1* | 6/2013 | Adzic | G06F 16/955 707/634 |
| 2014/0282032 A1* | 9/2014 | Brown | G06F 3/0484 715/738 |
| 2014/0365900 A1* | 12/2014 | Chu | G06F 16/9554 715/738 |
| 2015/0046843 A1* | 2/2015 | Vohra | H04M 1/72561 715/753 |
| 2015/0046848 A1* | 2/2015 | Vohra | H04M 1/72522 715/760 |
| 2015/0128110 A1* | 5/2015 | Falk | G06F 11/3636 717/128 |
| 2018/0013720 A1* | 1/2018 | Sachdev | G06Q 30/00 |

\* cited by examiner

MOBILE APPLICATION WEBVIEW MODIFICATION

RELATED APPLICATIONS

This application claims the benefit of, and priority to, U.S. Provisional Patent Application No. 62/492,410, entitled "MOBILE APPLICATION WEBVIEW MODIFICATION" filed May 1, 2017, which is hereby incorporated by reference in its entirety for all purposes.

TECHNICAL BACKGROUND

Modern computing systems such as smartphones, tablets, and other mobile devices enable users to install and run various applications. These mobile applications typically provide a wide range of functionality, such as streaming video, social networking, games, email, instant messaging, weather, navigation, or any other mobile application. An application may be referred to as "native" when the application program code has been developed for use on a particular platform or device. A "webview" typically describes a web browser bundled inside of a mobile application, resulting in what is termed a "hybrid" application. The webview feature of a mobile application can enable a uniform resource locator (URL) to be loaded by the browser within the application, instead of launching a separate browser application. The hypertext markup language (HTML), JavaScript, and other web code can then run in the internal webview browser that is wrapped inside the native application.

In the fields of computer hardware and software technology, application developers commonly use test features such as A/B testing, staged rollouts, and feature toggling to test various features on subsets of the user base. For example, A/B testing, also called split testing, provides for simultaneously testing a modified version, or variant, against a pre-existing version by splitting the two versions between different user groups and monitoring the results. Staged rollout is another testing technique (also referred to as "slow rollout" or "phased rollout"), which involves pushing out a feature gradually to increasing numbers of the user base. Feature toggling, or feature flagging, is a technique where a new area of code or a newly designed feature is compartmentalized to facilitate activation and deactivation of the feature without affecting the rest of the application. The feature toggling technique enables developers to push out partially tested code in a way where the code can be shut off quickly without a new build release if any problems are detected. The above techniques can also be combined effectively. For example, once a feature is behind a flag, an application developer can expose it to a small subset of users to ensure a feature works as planned, and subsequently push the feature out to the remaining users gradually.

In various runtime environments, it is possible to modify how a method, function, class, or other such software component maps to the actual code implementation of the component. Sometimes referred to as swizzling, such re-mapping technology allows code associated with one function to be replaced by code associated with another function. This may be useful in the context of making modifications to a user interface of an application, for example. Some implementations of re-mapping technology involve modifying the value of a pointer that points to a location in memory where a method is implemented in code. By changing the value of the pointer, the method can be made to point to other code such that, when the method is called, a different method is employed in its place. The target method that is called in place of the original method is sometimes referred to as a callback function. Such techniques may enable a software development toolkit (SDK) to make modifications to an application without altering the main program code of the application.

Overview

Provided herein are techniques to facilitate modification of content displayed in a webview embedded into a mobile application. In at least one implementation, webview modification instructions provided by an application development and optimization platform are received that indicate modified webview content associated with a uniform resource identifier (URI) accessed by the mobile application in the webview. Execution of the mobile application is monitored for an occurrence of an event that triggers loading of the URI in the webview of the mobile application. Responsive to the event, the webview modification instructions are executed to present the modified webview content in the webview of the mobile application.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Mobile application designers often desire to make changes and updates to visual elements and other aspects of the user interface of an application. Ordinarily, such changes would require the application developers to edit program code to implement the new application design requirements. However, a framework can be installed into a mobile application which can receive and interpret changes to visual properties of display elements, providing a quick and easy way for designers to edit the user interface of a mobile application without having to write any programming code. Such changes and new features can then be tested on subsets of the user base using various techniques such as A/B testing, staged rollouts, and feature toggling. In some instances, this same framework may be utilized to implement modifications to visual elements and other web content displayed within a webview of a mobile application. In some examples, the framework may utilize a software development kit (SDK) to override a pre-set webview URL in the application to redirect the webview to a different URL when the webview is launched. For example, an application developer could design an alternative or updated version of a webpage using HTML, Cascading Style Sheets (CSS), JavaScript, and any other web-based program code and utilize the application development and optimization platform described herein to redirect a webpage launched within a webview of a mobile application to instead load the updated version of the webpage. Additionally or alternatively, the application developer could utilize the application development and optimization platform to insert scripting code such as JavaScript to enable modifications to HTML, CSS, and other web content displayed within the webview of the application. For example, after a URL is loaded within a webview, custom JavaScript code could execute that makes modifications to the visual elements of the web content, such as changing the font style, size, and color of the webpage title.

Systems, methods, and software are disclosed herein that enhance application development and software design-for-test (DFT) technology utilizing an application development and optimization platform to facilitate modifications to visual elements and other web content displayed within a webview of a mobile application. Among other benefits, the techniques described herein provide application developers the ability to modify and control the title, images, buttons, text, and any other web content that is displayed within a webview of an application. The following disclosure provides various techniques for modifying content displayed in a webview embedded into a mobile application.

Figure 1:
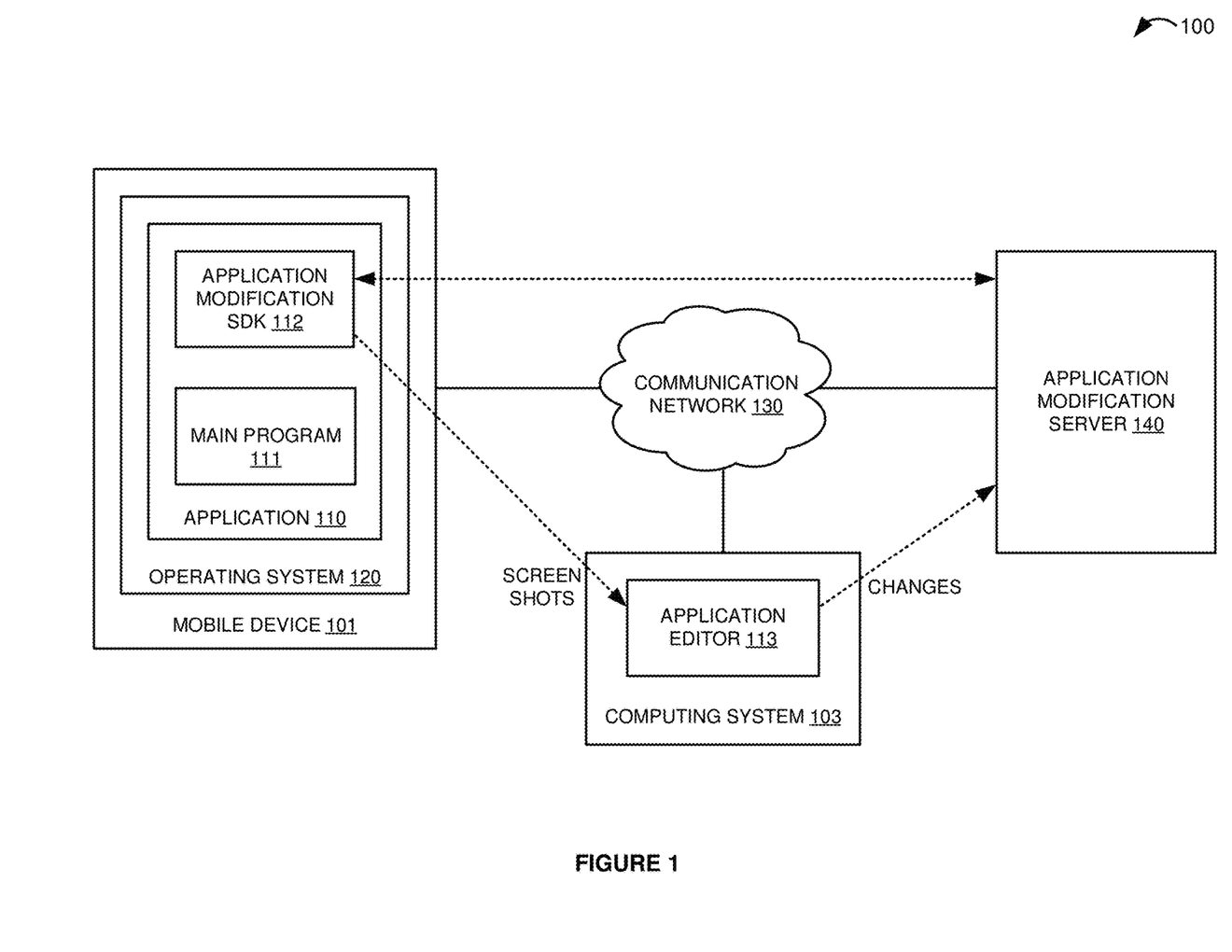
FIG. 1 is a block diagram that illustrates a communication system.
Figure 2:
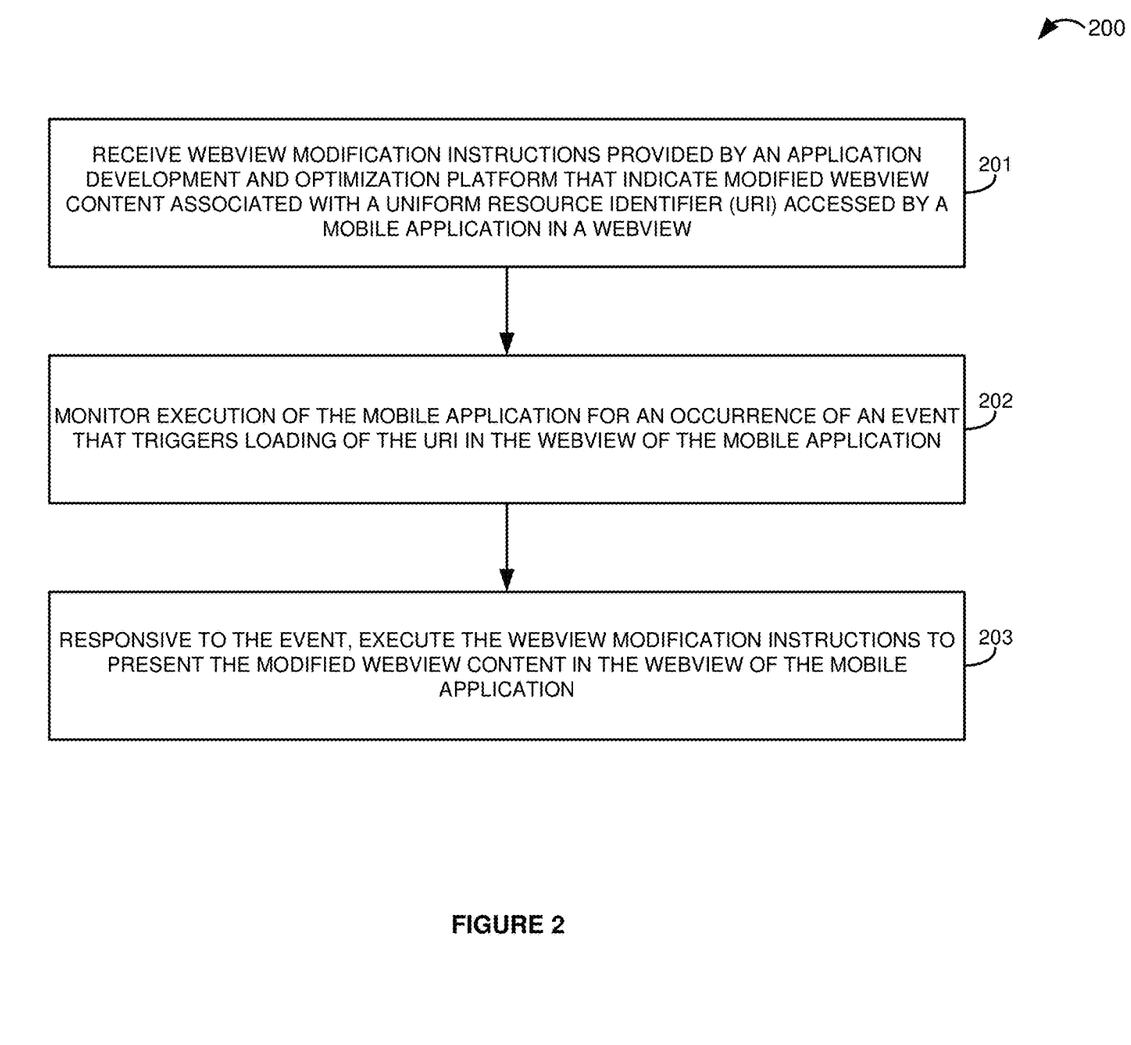
FIG. 2 is a flow diagram that illustrates an operation of a communication system in an exemplary embodiment.
Figure 3:
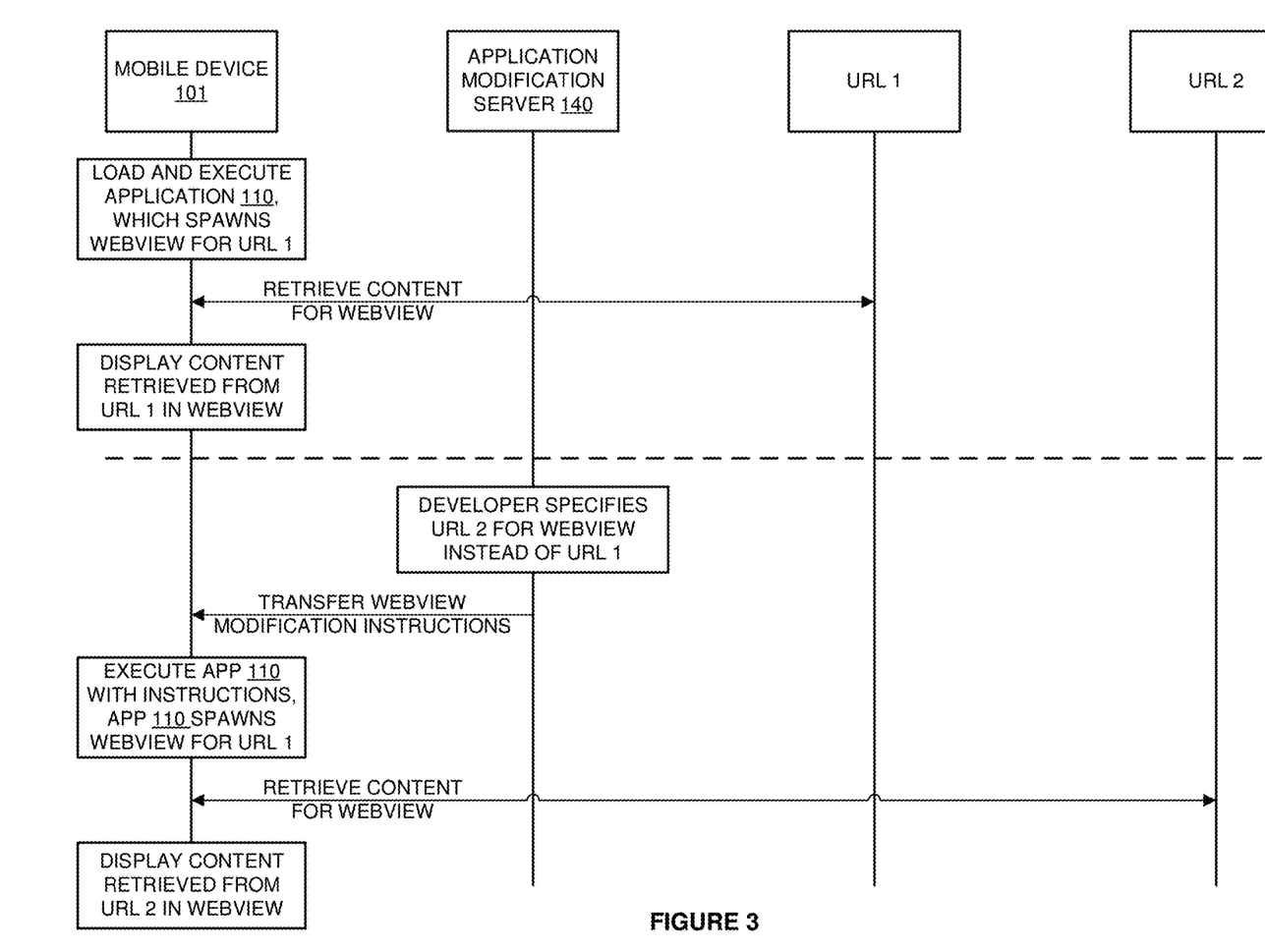
FIG. 3 is a sequence diagram that illustrates an operation of a communication system in an exemplary embodiment.

Referring now to the drawings, FIG. 1 illustrates a communication system that may be utilized to implement modifications to visual elements and other web content displayed within a webview of a mobile application. FIG. 2 illustrates an operation of the communication system in an exemplary embodiment. FIG. 3 is a sequence diagram that illustrates another operation of the communication system in an exemplary embodiment. FIGS. 4-8 illustrate various exemplary graphical displays of applications, while FIG. 9 illustrates an exemplary computing system that may be used to perform any of the techniques, processes, and operational scenarios described herein.

Turning now to FIG. 1, a block diagram of communication system 100 is illustrated. Communication system 100 includes mobile device 101, computing system 103, communication network 130, and application modification server 140. Mobile device 101 includes operating system 120 and application 110. Application 110 runs on operating system 120. Mobile device 101 may also include a user interface that communicates with operating system 120 over a bus communication device. Application 110 comprises main program 111 and application modification software development kit (SDK) 112, which may be implemented as different software modules of application 110. Main program 111 comprises the primary program instructions for the functionality of the application, such as streaming video, social networking, email, instant messaging, weather, navigation, or any other mobile application. Application modification SDK 112 may be installed into application 110 to facilitate changes and updates to a user interface and other visual elements of the application 110, perform A/B testing of different application design variants, and other functionality. In some examples, application modification SDK 112 could comprise an embedded control module of application 110. Computing system 103 includes application editor 113. Computing system 103 may also include an operating system and user interface, although these components are not shown for clarity. Application modification server 140 comprises a computing system that provides an application development and optimization platform. In some examples, application editor 113 may comprise a web browser application that loads the application development and optimization platform provided by application modification server 140.

In operation, a developer of application 110 may execute application editor 113 on computing system 103 to operate an application management dashboard to apply real-time changes and updates to a user interface and other visual elements of the application 110, activate or deactivate features, perform A/B testing of different application design variants to determine how changes to application 110 affect user behavior, modify web content displayed within a webview, and other functionality. The developer may execute application 110 on mobile device 101 for use as a test device, and the execution of application 110 is then mirrored in the visual editor 113 executing on computing system 103. The mirrored execution of application 110 within application editor 113 is achieved by application modification SDK 112 transferring screenshots of the application 110 to computing system 103 for display within the editor 113, which may communicate over web sockets. SDK 112 sends information about the user interface of application 110 to computing system 103 for display within application editor 113, including the entire view hierarchy of application 110, which comprises descriptions or labels of all views that exist in the current interface and screenshots of the views. In this manner, the screenshots of the views can be displayed as images on the screen within the visual application editor 113, and the view descriptions, labels, and any other information may be displayed in a tree structure or tree diagram that represents the view hierarchy structure in a graphical form.

Once the visual application editor 113 receives and displays the view hierarchy of application 110, the developer can then click through the various views within the view hierarchy and make changes to different visual elements of the user interface. These changes are then sent to the application modification server 140 which can instantly update the display of application 110 with the changes in real-time on mobile device 101 via communication with application modification SDK 112. Similarly, other application management functionality of the visual application editor 113 may be created and communicated to application modification server 140 and subsequently deployed to application 110 on mobile device 101 by communicating with SDK 112. Of course, any of the functionality described herein could be applied to numerous instances of application 110 installed on multitudes of user mobile devices which may affect some or all of the entire user base, but only one mobile device 101 is shown in FIG. 1 for clarity. An exemplary operation of communication system 100 will now be discussed with respect to FIG. 2.

FIG. 2 is a flow diagram that illustrates an operation of communication system 100 in an exemplary implementation. The operation 200 shown in FIG. 2 may also be referred to as webview modification process 200 herein. The steps of the operation are indicated below parenthetically. The following discussion of operation 200 will proceed with reference to elements of communication system 100 of FIG. 1 in order to illustrate its operations, but note that the details provided in FIG. 1 are merely exemplary and not intended to limit the scope of process 200 to the specific implementation of FIG. 1.

Operation 200 may be employed by computing system 101 to facilitate modification of content displayed in a webview embedded into mobile application 110. As shown in the operational flow of FIG. 2, mobile device 101 receives webview modification instructions provided by an application development and optimization platform that indicate modified webview content associated with a uniform resource identifier (URI) accessed by the mobile application in the webview (201). In some examples, the URI accessed by mobile application 110 in the webview could comprise a Uniform Resource Locator (URL) of a website, an address of a file or other resource on a web server, or a location of any other web content. The webview may comprise a web browser embedded into mobile application 110 which is capable of loading and displaying various web content within the webview. The webview modification instructions may be defined by an owner of application 110 or some other administrator with access to the application development and optimization platform provided by application modification server 140. For example, the application developer can utilize the application development and optimization platform to configure the webview modification instructions by specifying an alternative URI for the webview content and/or providing customized JavaScript or other code to alter the format, layout, style, visual appearance, and other display properties of the original webview content provided by the URI programmed into mobile application 110. In some examples, the webview modification instructions may be requested by mobile device 101 and pulled from the application development and optimization platform provided by application modification server 140, or could be pushed by server 140 automatically for delivery to mobile device 101. In at least one implementation, a control module embedded into application 110, such as application modification SDK 112 in this example, may query the application development and optimization platform provided by application modification server 140 for the webview modification instructions.

In some implementations, the webview modification instructions could be included in a manifest provided by the application development and optimization platform. For example, when mobile device 101 launches application 110, a control module embedded into application 110, such as application modification SDK 112 in this example, may query the application development and optimization platform provided by application modification server 140 for the latest manifest. In other words, a manifest query may be communicated by mobile device 101 responsive to launching or executing application 110. The application development and optimization platform would then responsively send the manifest (or updated manifest) comprising the webview modification instructions for delivery to application 110 executing on mobile device 101. The manifest may be used to convey information to mobile device 101 about real-time changes that apply to mobile application 110, including webview modification instructions that indicate modified webview content associated with a URI accessed by mobile application 110 in a webview. For example, in addition to the webview modification instructions, the manifest can include instructions to enable or disable certain features of application 110, instructions to replace objects with different objects upon occurrence of an action or event, or any other instructions. In some examples, a control module embedded into application 110, such as SDK 112, could process the webview modification instructions to determine the modified webview content that should be displayed in the webview when the associated URI is accessed by application 110. The webview modification instructions may optionally be stored in a local data store on mobile device 101, which may later be accessed to replace and/or modify the content displayed in the webview when the associated URI is accessed.

Mobile device 101 monitors execution of mobile application 110 for an occurrence of an event that triggers loading of the URI in the webview of mobile application 110 (202). In some examples, the event that triggers loading of the URI in the webview of mobile application 110 may be specified in the webview modification instructions, but in general, any transition from the execution of main programming code of application 110 into the webview could comprise the triggering event. For example, mobile device 101 could monitor execution of mobile application 101 for the occurrence of the event that triggers loading of the URI in the webview by detecting application code of mobile application 101 calling the webview. In another example, the event that triggers loading of the URI in the webview could comprise spawning of the webview in mobile application 110. In at least one implementation, a control module installed into application 110, such as SDK 112, may monitor program instructions of mobile application 110 executing on mobile device 101 for occurrence of the event that triggers loading of the URI in the webview of mobile application 110. In some examples, application 110 could be preconfigured to monitor for creation of the webview for the URI specified in the webview modification instructions to automatically detect the occurrence of the event. Other techniques for monitoring the execution of mobile application 110 for the occurrence of the event that triggers loading of the URI in the webview of mobile application 110 are possible and within the scope of this disclosure.

Responsive to the event, mobile device 101 executes the webview modification instructions to present the modified webview content in the webview of mobile application 110 (203). In at least one implementation, the modified webview content comprises an alternative URI, and mobile device 101 executing the webview modification instructions to present the modified webview content in the webview comprises device 101 replacing the URI in the webview of mobile application 101 with the alternative URI. Accordingly, the modified webview content available at the alternative URI is presented to the user in the webview instead of the original web content accessible at the URI programmed into mobile application 110. In some examples, the modified webview content could comprise JavaScript code, and mobile device 101 executing the webview modification instructions to present the modified webview content in the webview comprises mobile device 101 loading the URI in the webview of mobile application 101 and generating the modified webview content by applying the JavaScript code. In this manner, the original web content loaded from the URI may be subsequently modified by executing the JavaScript code to apply changes to the original web content and thereby generate the modified webview content. In some examples, a control module installed into application 110, such as SDK 112, may access a local data store to retrieve and execute the webview modification instructions responsive to the event. In this case, the control module, responsive to the event that triggers loading of the URI in the webview of mobile application 110, executes the webview modification instructions to present the modified webview content in the webview of mobile application 110 instead of the content accessible at the original URI.

Advantageously, application 110 receives and executes webview modification instructions to present modified webview content in a webview of mobile application 110 instead of the original content. Further, an application developer is able to apply these webview modification instructions to some or all existing copies of application 110 that have already been deployed and were initially configured to load the content available at the specified URI in the webview, but which will now present the modified webview content in the webview as directed in the webview modification instructions. In this manner, the content that mobile application 110 loads in a webview can be effectively updated dynamically by specifying an updated or alternative URI in the webview modification instructions that overrides the original URI set in the programming code of application 110 for that webview. Additionally or alternatively, JavaScript or other code can be included in the webview modification instructions that may be applied to the original web content loaded from the specified URI to generate the modified webview content for display in the webview. Another exemplary operation of communication system 100 will now be discussed with respect to FIG. 3.

FIG. 3 is a sequence diagram that illustrates an operation of communication system 100 in an exemplary implementation. In this example, mobile device 101 initially loads and executes mobile application 110. When the user selects a button to view the terms of service of mobile application 110, application 110 has been programmed to launch a webview and display the terms of service located at "URL 1" within the webview. Accordingly, when the user selects to view the terms of service, application 110 spawns a webview for "URL 1" and retrieves the terms of service content from "URL 1". Application 110 then displays the content retrieved from "URL 1" within the webview.

Subsequently, a developer of application 110 desires to update the terms of service content, but does not want to change the programming code of application 110 or deploy an updated version of application 110 to the entire user base. Accordingly, the developer utilizes the application development and optimization platform provided by application modification server 140 to specify an updated URL of "URL 2" for loading the terms of service in the webview instead of "URL 1". Application modification server 140 then transfers the webview modification instructions for delivery to device 101 for processing by SDK 112 of mobile application 110.

Mobile device 101 executes mobile application 110 along with the webview modification instructions. In this example, SDK 112 processes the modification instructions and determines that an updated URL of "URL 2" has been specified for use within the webview when application 110 launches the webview initially programmed in application 110 to load "URL 1". Thus, when the user selects to view the terms of service at this time, application 110 spawns the webview for "URL 1", but SDK 112 detects this event and hooks in to redirect the content acquisition from "URL 2" instead of "URL 1". Accordingly, application 110 retrieves the updated terms of service content from "URL 2". Application 110 then displays the alternate terms of service content retrieved from "URL 2" within the webview instead of the original terms of service provided by "URL 1". In this manner, the application developer can effectively update the content displayed within a webview of application 110 dynamically, without making any changes to the programming code of application 110 or deploying an updated version of application 110. Various operational scenarios involving mobile device 101 and computing system 103 to modify visual elements and other aspects of web content displayed within a webview of mobile application 110 will now be described with respect to FIGS. 4-8.

Figure 4:
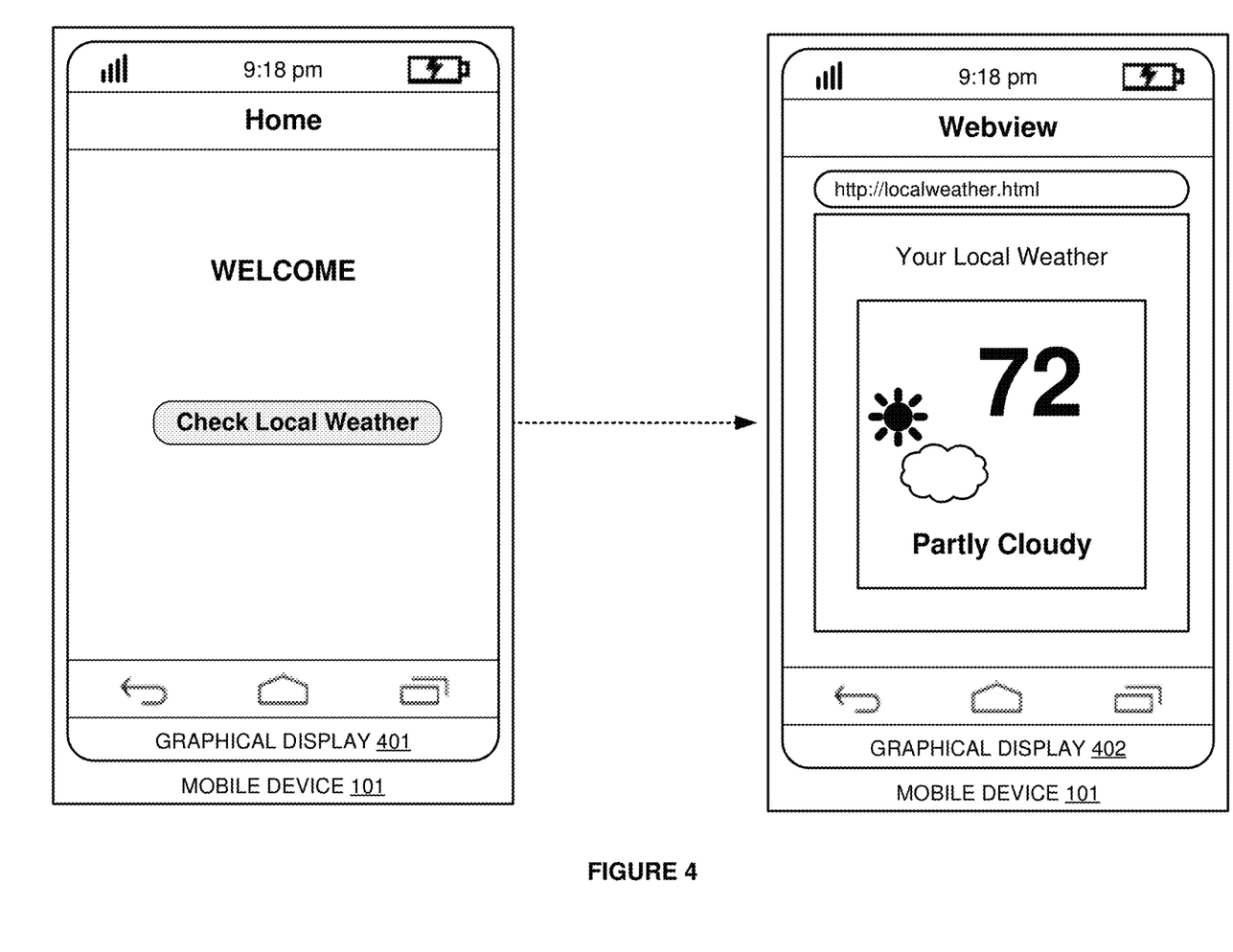
FIG. 4 illustrates exemplary graphical displays of an application on a mobile device.

FIG. 4 illustrates exemplary graphical displays 401 and 402 of application 110 executing on mobile device 101. In this example, graphical display 401 provides a home screen of application 110. The home screen welcomes the user and provides a button labeled "Check Local Weather". In this example, the button is configured to open a URL in a webview within application 110. The effect of a user selecting the button to open the URL in the webview is illustrated in graphical display 402. In this example, the URL directs the webview of application 110 to load the "localweather.html" file, as shown in graphical display 402. The "localweather.html" file comprises HTML and other web code configured to display local weather information for the user in the format and arrangement shown in graphical display 402. In particular, the title "Your Local Weather" is displayed within the webview, along with a numerical temperature reading of "72" degrees positioned above an image of the sun and clouds and the words "Partly Cloudy" appearing along the bottom. A technique to modify and customize the web content displayed within the webview of application 110 will now be described with respect to FIGS. 5-8.

Figure 5:
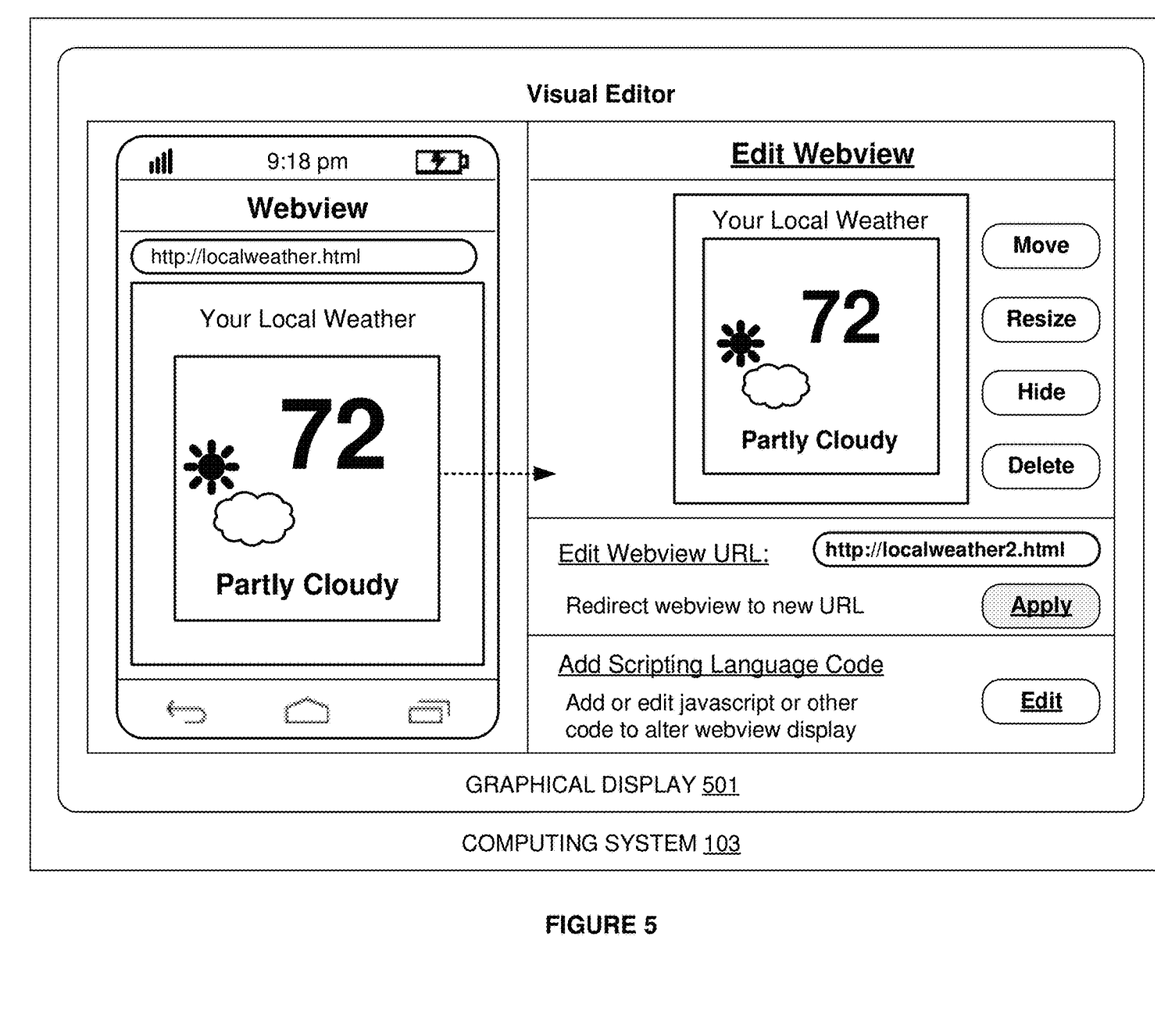
FIG. 5 illustrates an exemplary graphical display of an application on a computing system.

Referring now to FIG. 5, an exemplary graphical display 501 of application editor 113 executing on computing system 103 is illustrated. In this example, an application developer is executing application 110 on mobile device 101 as a test device, and the execution of application 110 is paired with application editor 113 executing on computing system 103. As shown in graphical display 501, the application developer is provided with a user interface of visual editor 113 which is divided vertically into two panes, with the mirrored view of application 110 executing on mobile device 101 appearing in the left-hand pane, and an editor window appearing in the right-hand pane. In this example, the developer has accessed the "Edit Webview" editor window to modify various properties of the webview for mobile application 110 by clicking on the webview element of application 110 appearing in the mirrored view on the left. The editor window provides the ability to move or relocate the webview element around the display screen, resize the webview element window, hide the webview element from view, or delete the webview element from the application. In addition, the webview editor provides the ability to edit the webview URL or add scripting language code. In this example, the developer has selected to edit the webview URL and has entered "http://localweather2.html" in order to redirect the webview to this new URL. The "localweather2.html" file comprises HTML and other web program code configured to display local weather information in an alternative format and arrangement than that of the default "localweather.html" file shown in graphical display 501 and graphical display 402 of FIG. 4. This change could apply to all existing applications that have already been deployed to various users and were previously configured to open the original "http://localweather.html" URL when a user selects that webview, although targeting the change to only certain user groups or even individual users is also possible. The result of the developer selecting the "Apply" button on graphical display 501 in order to redirect the webview to the "http://localweather2.html" URL is shown in FIG. 6.

Figure 6:
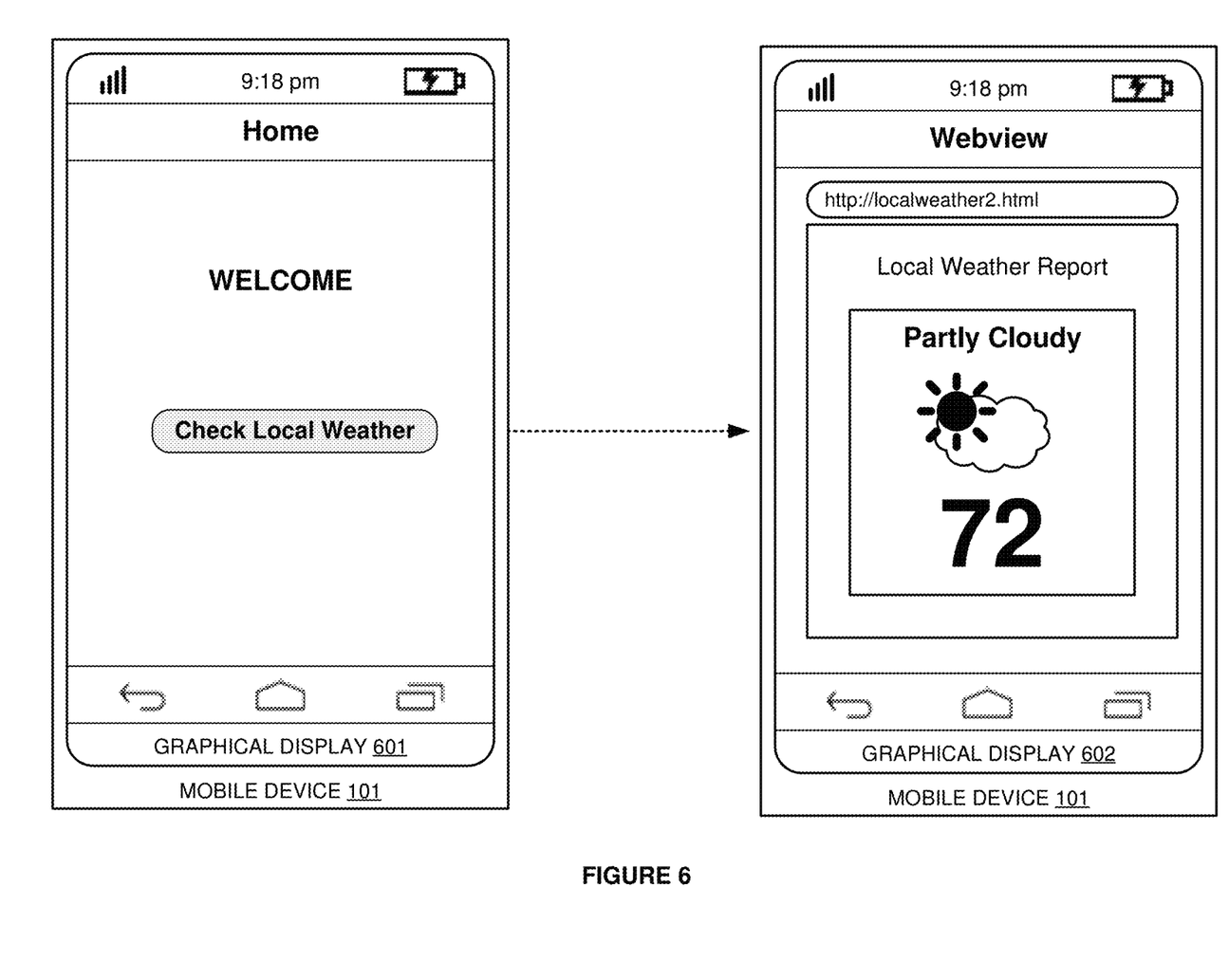
FIG. 6 illustrates exemplary graphical displays of an application on a mobile device.

FIG. 6 illustrates exemplary graphical displays 601 and 602 of application 110 executing on mobile device 101. This example shows the effect of a user selecting the "Check Local Weather" button of graphical display 601 to open the URL in the webview as shown in graphical display 602. However, in this example, since the original URL of "http://localweather.html" has been updated by the developer to the "http://localweather2.html" URL, this change overrides the original URL and the "localweather2.html" file is loaded in the webview instead. In at least one implementation, this may occur by SDK 112 detecting that a new URL was set to override the original URL, and responsively directing application 110 to load the new "http://localweather2.html" URL in the webview instead of the original URL. For example, when the user desires to access the webview content and selects the "Check Local Weather" button of graphical display 601, SDK 112 hooks in and directs application 110 to reload the webview content to the "http://localweather2.html" URL.

In some implementations, the trigger to override the URL may occur when SDK 112 detects a transition from the application code into the webview, or upon the application code calling the webview. For example, when a user selects the "Check Local Weather" button of graphical display 601, the application code may be configured to open a new display screen, such as graphical display 602 in this example, and within that screen the application code is configured to create a webview and open the "http://localweather.html" URL with that webview. When SDK 112 detects this transition to the webview, SDK 112 may hijack that instruction to open the "http://localweather.html" URL and replace it with an instruction to open the "http://localweather2.html" URL instead. Accordingly, the "http://localweather2.html" URL web content is displayed in the webview as shown in graphical display 602. The "localweather2.html" file comprises HTML and other web code configured to display local weather information for the user in the format and arrangement shown in graphical display 602. In particular, the title "Local Weather Report" is displayed within the webview, instead of the original title of "Your Local Weather" shown in display 402 of FIG. 4. In addition, the words "Partly Cloudy" and the image of the sun and clouds are relocated above the numerical temperature reading of "72" degrees, which now appears along the bottom. In this manner, the web content displayed within the webview may be modified by providing an updated URL to redirect the webview to load alternative HTML code. Another technique to modify and customize the web content displayed within the webview of application 110 will now be described with respect to FIGS. 7 and 8.

Figure 7:
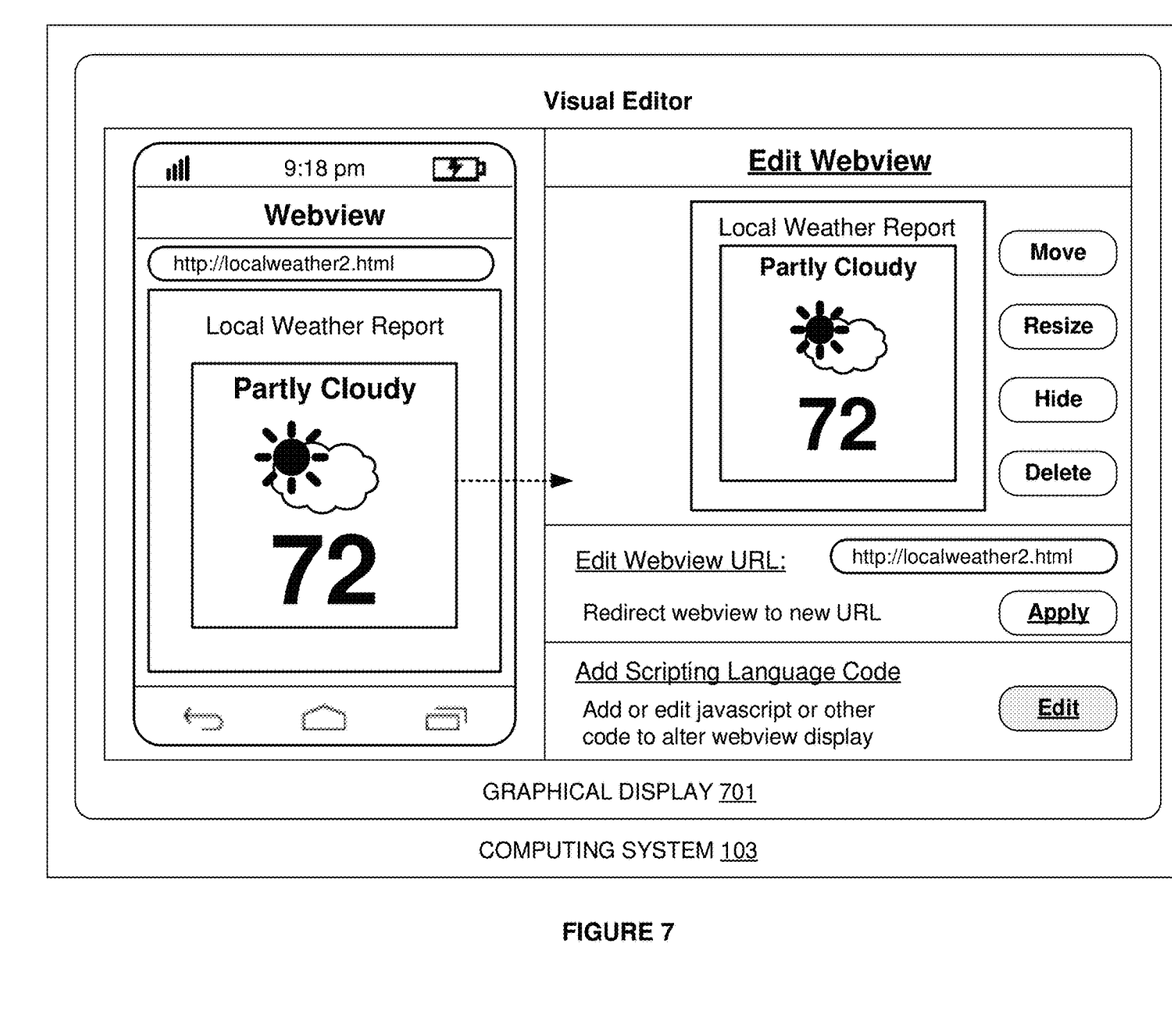
FIG. 7 illustrates an exemplary graphical display of an application on a computing system.

Referring now to FIG. 7, an exemplary graphical display 701 of application editor 113 executing on computing system 103 is illustrated. As shown in graphical display 701, the application developer is provided with a user interface of visual editor 113 which is divided vertically into two panes, with a mirrored view of application 110 executing on mobile device 101 appearing in the left-hand pane, and an editor window appearing in the right-hand pane. The mirrored view of application 110 appearing on the left shows the effect of the developer modifying the webview URL to instead load the "http://localweather2.html" URL, as discussed above with respect to FIGS. 5 and 6. The developer has accessed the "Edit Webview" editor window to modify various properties of the webview for mobile application 110 by clicking on the webview element of application 110 appearing in the mirrored view on the left. In this example, the application developer selects the "Edit" button at the bottom of the "Edit Webview" editor window to add scripting language code for modifying the webview display. This feature enables the developer to add JavaScript or other code into the visual editor 113 to enable modifications of HTML and other web content within the webview. The custom scripting language code provided by the application developer may be executed after the webview loads the target URL in some examples. For example, in some implementations, SDK 112 could be configured to detect when the application code creates the webview and loads the target URL for the webview, and then execute custom JavaScript code designed to alter visual elements of the web content provided by the developer in the visual editor 113. The result of the developer selecting the "Edit" button on graphical display 701 and inserting customized scripting language code in the visual editor 113 is shown in FIG. 8.

Figure 8:
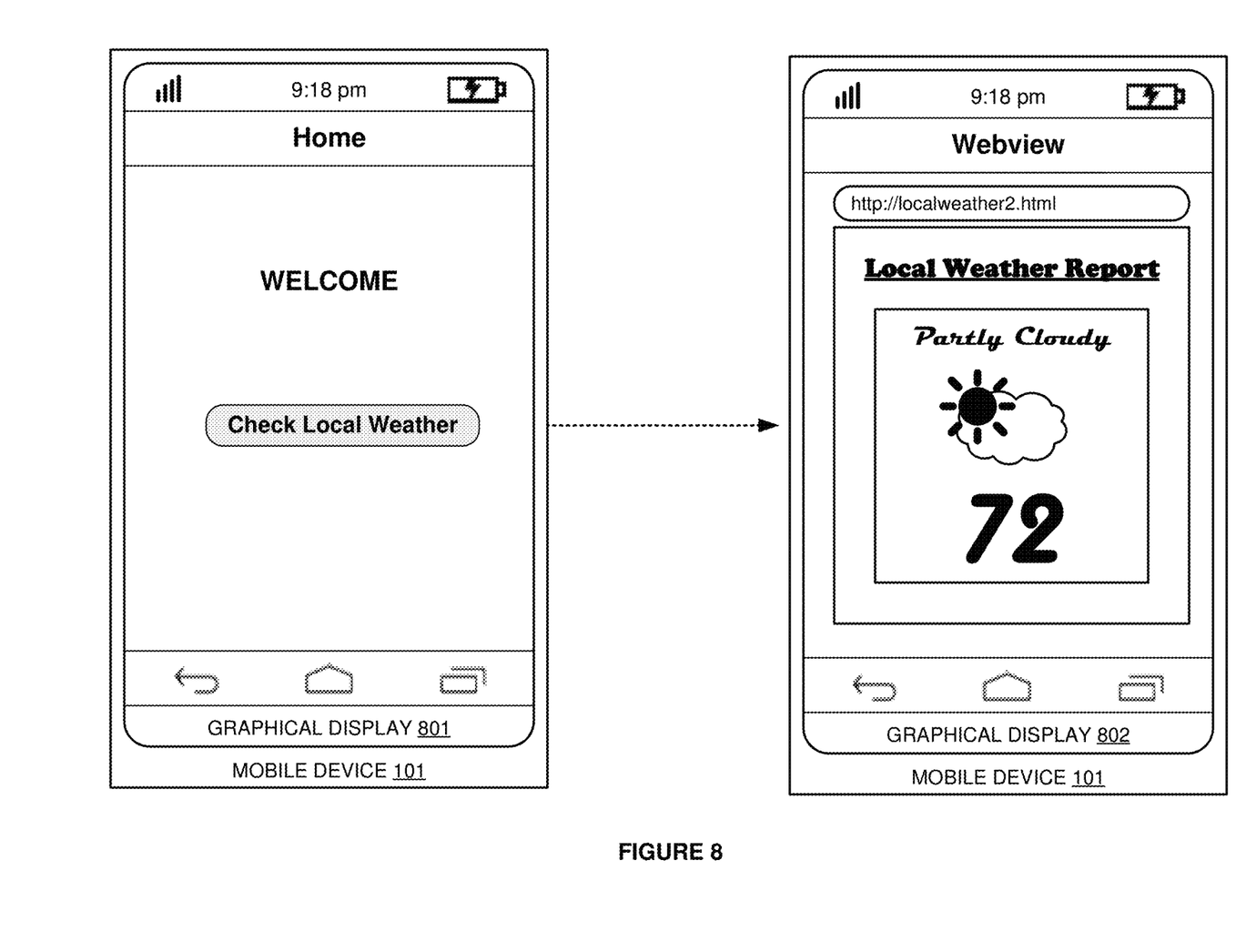
FIG. 8 illustrates exemplary graphical displays of an application on a mobile device.
Figure 9:
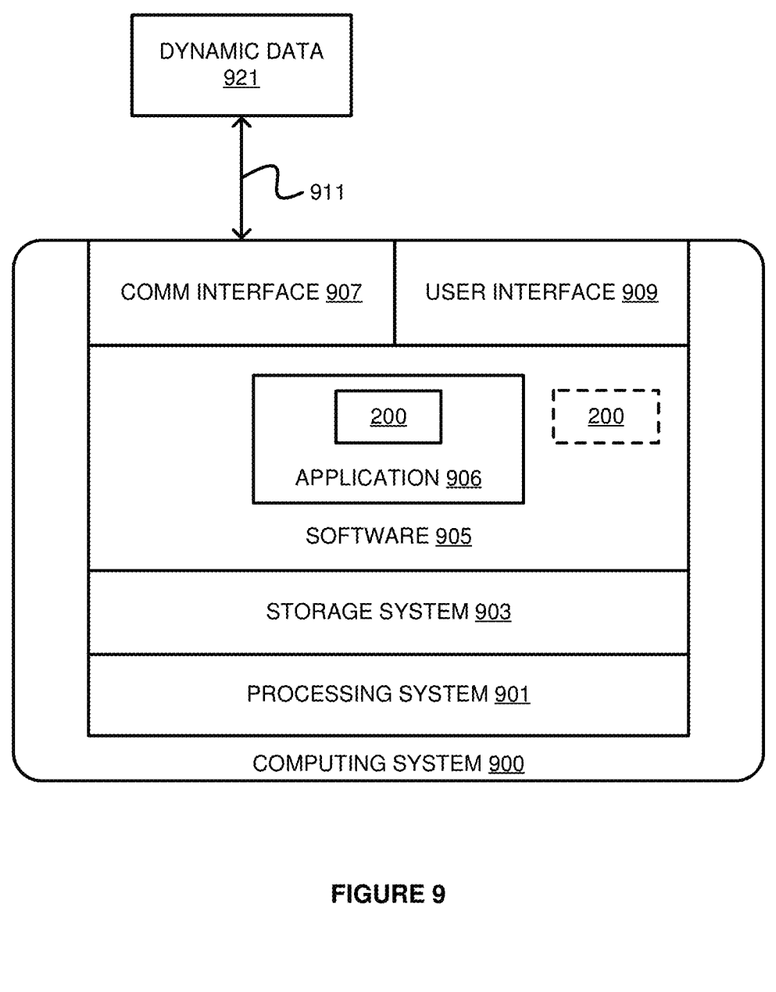
FIG. 9 is a block diagram that illustrates a computing system.

FIG. 8 illustrates exemplary graphical displays 801 and 802 of application 110 executing on mobile device 101. This example shows the effect of a user selecting the "Check Local Weather" button of graphical display 801 to open the URL in the webview as shown in graphical display 802. However, in this example, since the original URL of "http://localweather.html" has been updated by the developer to the "http://localweather2.html" URL as discussed above with respect to FIG. 5, this change overrides the original URL and the "localweather2.html" file is loaded in the webview instead. In addition, the developer has provided JavaScript code that provides modifications to visual elements of the web content. Accordingly, after the "http://localweather2.html" URL is loaded in the webview, the custom JavaScript code is executed to further modify the web content appearing in the webview. In this example, the font type, style, and size of the title "Local Weather Report" are modified by the JavaScript code, along with the title now being underlined. In addition, the text of "Partly Cloudy" and the temperature reading of "72" degrees have a different font type and italicized style applied by the code. In some implementations, these changes could be implemented by configuring the JavaScript code to locate the specified textual elements within the web content and apply the modifications. Additional modifications could be made to other visual elements of the web content in a similar manner, including non-textual elements such as buttons, images, animations, videos, web form fields, or any other web content. In some examples, SDK 112 could determine that the developer has supplied custom JavaScript code in the visual editor 113 as described above with respect to FIG. 7, and responsively execute the JavaScript code after application 110 creates the webview and loads the web content. In at least one implementation, this code execution may occur in addition to SDK 112 first directing application 110 to load a new URL in the webview instead of the original URL as discussed above. For example, when the user desires to access the webview content and selects the "Check Local Weather" button of graphical display 801, SDK 112 may hook in and direct application 110 to actually load the webview content at the "http://localweather2.html" URL, and subsequently execute the custom JavaScript code which further modifies the web content. In this manner, the web content displayed within the webview may be modified by executing the customized scripting language code that has been configured with the desired modifications.

Now referring back to FIG. 1, mobile device 101 comprises a processing system and communication transceiver. Mobile device 101 may also include other components such as a user interface, data storage system, and power supply. Mobile device 101 may reside in a single device or may be distributed across multiple devices. Examples of mobile device 101 include mobile computing devices, such as cell phones, tablet computers, laptop computers, notebook computers, and gaming devices, as well as any other type of mobile computing devices and any combination or variation thereof. Examples of mobile device 101 may also include desktop computers, server computers, and virtual machines, as well as any other type of computing system, variation, or combination thereof.

Computing system 103 comprises a processing system and communication transceiver. Computing system 103 may also include other components such as a user interface, data storage system, and power supply. Computing system 103 may reside in a single device or may be distributed across multiple devices. Examples of computing system 103 include mobile computing devices, such as cell phones, tablet computers, laptop computers, notebook computers, and gaming devices, as well as any other type of mobile computing devices and any combination or variation thereof. Examples of computing system 103 also include desktop computers, server computers, and virtual machines, as well as any other type of computing system, variation, or combination thereof.

Communication network 130 could comprise multiple network elements such as routers, gateways, telecommunication switches, servers, processing systems, or other communication equipment and systems for providing communication and data services. In some examples, communication network 130 could comprise wireless communication nodes, telephony switches, Internet routers, network gateways, computer systems, communication links, or some other type of communication equipment, including combinations thereof. Communication network 130 may also comprise optical networks, packet networks, local area networks (LAN), metropolitan area networks (MAN), wide area networks (WAN), or other network topologies, equipment, or systems—including combinations thereof. Communication network 130 may be configured to communicate over metallic, wireless, or optical links. Communication network 130 may be configured to use time-division multiplexing (TDM), Internet Protocol (IP), Ethernet, optical networking, wireless protocols, communication signaling, or some other communication format, including combinations thereof. In some examples, communication network 130 includes further access nodes and associated equipment for providing communication services to several computer systems across a large geographic region.

Application modification server 140 may be representative of any computing apparatus, system, or systems that may connect to another computing system over a communication network. Application modification server 140 comprises a processing system and communication transceiver. Application modification server 140 may also include other components such as a router, server, data storage system, and power supply. Application modification server 140 may reside in a single device or may be distributed across multiple devices. Application modification server 140 may be a discrete system or may be integrated within other systems, including other systems within communication system 100. Some examples of application modification server 140 include desktop computers, server computers, cloud computing platforms, and virtual machines, as well as any other type of computing system, variation, or combination thereof.

Referring now to FIG. 9, a block diagram that illustrates computing system 900 in an exemplary implementation is shown. Computing system 900 provides an example of mobile device 101, computing system 103, application modification server 140, or any computing system that may be used to execute webview modification process 200 or variations thereof, although such systems could use alternative configurations. Computing system 900 includes processing system 901, storage system 903, software 905, communication interface 907, and user interface 909. Software 905 includes application 906 which itself includes webview modification process 200. Webview modification process 200 may optionally be implemented separately from application 906 as indicated by the dashed lines surrounding process 200 in FIG. 9.

Computing system 900 may be representative of any computing apparatus, system, or systems on which application 906 and webview modification process 200 or variations thereof may be suitably implemented. Computing system 900 may reside in a single device or may be distributed across multiple devices. Examples of computing system 900 include mobile computing devices, such as cell phones, tablet computers, laptop computers, notebook computers, and gaming devices, as well as any other type of mobile computing devices and any combination or variation thereof. Note that the features and functionality of computing system 900 may apply as well to desktop computers, server computers, and virtual machines, as well as any other type of computing system, variation, or combination thereof.

Computing system 900 includes processing system 901, storage system 903, software 905, communication interface 907, and user interface 909. Processing system 901 is operatively coupled with storage system 903, communication interface 907, and user interface 909. Processing system 901 loads and executes software 905 from storage system 903. When executed by computing system 900 in general, and processing system 901 in particular, software 905 directs computing system 900 to operate as described herein for each implementation or variations thereof. Computing system 900 may optionally include additional devices, features, or functionality not discussed herein for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer-readable storage media capable of storing software 905 and readable by processing system 901. Storage system 903 may include volatile and nonvolatile, removable and non-removable media implemented in any method or technology for storage of information, such as computer readable instructions, data structures, program modules, or other data. Storage system 903 may be implemented as a single storage device but may also be implemented across multiple storage devices or sub-systems co-located or distributed relative to each other. Storage system 903 may comprise additional elements, such as a controller, capable of communicating with processing system 901. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 909, processing system 901 loads and executes portions of software 905, such as webview modification process 200, to facilitate modification of content displayed in a webview embedded into a mobile application as described herein. Software 905 may be implemented in program instructions and among other functions may, when executed by computing system 900 in general or processing system 901 in particular, direct computing system 900 or processing system 901 to receive webview modification instructions provided by an application development and optimization platform that indicate modified webview content associated with a uniform resource identifier (URI) accessed by the mobile application in the webview. Software 905 may further direct computing system 900 or processing system 901 to monitor execution of the mobile application for an occurrence of an event that triggers loading of the URI in the webview of the mobile application. In addition, software 905 may direct computing system 900 or processing system 901 to, responsive to the event, execute the webview modification instructions to present the modified webview content in the webview of the mobile application.

Software 905 may include additional processes, programs, or components, such as operating system software or other application software. Examples of operating systems include Windows®, iOS®, and Android®, as well as any other suitable operating system. Software 905 may also comprise firmware or some other form of machine-readable processing instructions executable by processing system 901.

In general, software 905 may, when loaded into processing system 901 and executed, transform computing system 900 overall from a general-purpose computing system into a special-purpose computing system customized to facilitate modification of content displayed in a webview embedded into a mobile application as described herein for each implementation or variations thereof. For example, encoding software 905 on storage system 903 may transform the physical structure of storage system 903. The specific transformation of the physical structure may depend on various factors in different implementations of this description. Examples of such factors may include, but are not limited to the technology used to implement the storage media of storage system 903 and whether the computer-readable storage media are characterized as primary or secondary storage.

In some examples, if the computer-readable storage media are implemented as semiconductor-based memory, software 905 may transform the physical state of the semiconductor memory when the program is encoded therein. For example, software 905 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 900 is generally intended to represent a computing system with which software 905 is deployed and executed in order to implement application 906 and/or webview modification process 200 to operate as described herein for each implementation (and variations thereof). However, computing system 900 may also represent any computing system on which software 905 may be staged and from where software 905 may be distributed, transported, downloaded, or otherwise provided to yet another computing system for deployment and execution, or yet additional distribution. For example, computing system 900 could be configured to deploy software 905 over the internet to one or more client computing systems for execution thereon, such as in a cloud-based deployment scenario.

Communication interface 907 may include communication connections and devices that allow for communication between computing system 900 and other computing systems (not shown) or services, over a communication network 911 or collection of networks. In some implementations, communication interface 907 receives dynamic data 921 over communication network 911. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 909 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 909. In some examples, user interface 909 could include a touch screen capable of displaying a graphical user interface that also accepts user inputs via touches on its surface. The aforementioned user input devices are well known in the art and need not be discussed at length here. User interface 909 may also include associated user interface software executable by processing system 901 in support of the various user input and output devices discussed above. Separately or in conjunction with each other and other hardware and software elements, the user interface software and devices may provide a graphical user interface, a natural user interface, or any other kind of user interface. User interface 909 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate modification of content displayed in a webview embedded into a mobile application executed by a computing system, the method comprising:
in the computing system, receiving webview modification instructions provided by an application development and optimization platform that, wherein the webview modification instructions indicate modified webview content associated with a uniform resource identifier (URI) accessed by the mobile application in the webview;
monitoring execution of the mobile application for an occurrence of an event that triggers loading of the URI in the webview of the mobile application; and
responsive to the event, executing the webview modification instructions to present the modified webview content in the webview of the mobile application.

2. The method of claim 1 wherein the modified webview content comprises an alternative URI.

3. The method of claim 2 wherein executing the webview modification instructions to present the modified webview content in the webview comprises replacing the URI in the webview of the mobile application with the alternative URI.

4. The method of claim 1 wherein the modified webview content comprises JavaScript code.

5. The method of claim 4 wherein executing the webview modification instructions to present the modified webview content in the webview comprises loading the URI in the webview of the mobile application and generating the modified webview content by applying the JavaScript code.

6. The method of claim 1 wherein monitoring the execution of the mobile application for the occurrence of the event that triggers loading of the URI in the webview comprises detecting application code of the mobile application calling the webview.

7. The method of claim 1 wherein the event that triggers loading of the URI in the webview comprises spawning of the webview in the mobile application.

8. One or more computer-readable storage media having program instructions stored thereon to facilitate modification of content displayed in a webview embedded into a mobile application, wherein the program instructions, when executed by a computing system, direct the computing system to at least:
receive webview modification instructions provided by an application development and optimization platform that, wherein the webview modification instructions indicate modified webview content associated with a uniform resource identifier (URI) accessed by the mobile application in the webview;
monitor execution of the mobile application for an occurrence of an event that triggers loading of the URI in the webview of the mobile application; and
responsive to the event, execute the webview modification instructions to present the modified webview content in the webview of the mobile application.

9. The one or more computer-readable storage media of claim 8 wherein the modified webview content comprises an alternative URI.

10. The one or more computer-readable storage media of claim 9 wherein the program instructions direct the computing system to execute the webview modification instructions to present the modified webview content in the webview by directing the computing system to replace the URI in the webview of the mobile application with the alternative URI.

11. The one or more computer-readable storage media of claim 8 wherein the modified webview content comprises JavaScript code.

12. The one or more computer-readable storage media of claim 11 wherein the program instructions direct the computing system to execute the webview modification instructions to present the modified webview content in the webview by directing the computing system to load the URI in the webview of the mobile application and generate the modified webview content by applying the JavaScript code.

13. The one or more computer-readable storage media of claim 8 wherein the program instructions direct the computing system to monitor the execution of the mobile application for the occurrence of the event that triggers loading of the URI in the webview by directing the computing system to detect application code of the mobile application calling the webview.

14. The one or more computer-readable storage media of claim 8 wherein the event that triggers loading of the URI in the webview comprises spawning of the webview in the mobile application.

15. A computing apparatus comprising: one or more computer-readable storage media;
a processing system operatively coupled with the one or more computer-readable storage media; and
a mobile application stored on the one or more computer-readable storage media and including an embedded control module comprising program instructions that, when executed by the processing system, direct the processing system to at least;
receive webview modification instructions provided by an application development and optimization platform, wherein the webview modification instructions indicate modified webview content associated with a uniform resource identifier (URI) accessed by the mobile application in a webview;
monitor execution of the mobile application for an occurrence of an event that triggers loading of the URI in the webview of the mobile application; and
responsive to the event, execute the webview modification instructions to present the modified webview content in the webview of the mobile application.

16. The computing apparatus of claim 15 wherein the modified webview content comprises an alternative URI.

17. The computing apparatus of claim 16 wherein the program instructions direct the processing system to execute the webview modification instructions to present the modified webview content in the webview by directing the processing system to replace the URI in the webview of the mobile application with the alternative URI.

18. The computing apparatus of claim 15 wherein the modified webview content comprises JavaScript code.

19. The computing apparatus of claim 18 wherein the program instructions direct the processing system to execute the webview modification instructions to present the modified webview content in the webview by directing the processing system to load the URI in the webview of the mobile application and generate the modified webview content by applying the JavaScript code.

20. The computing apparatus of claim 15 wherein the program instructions direct the processing system to monitor the execution of the mobile application for the occurrence of the event that triggers loading of the URI in the webview by directing the processing system to detect application code of the mobile application calling the webview.

* * * * *